United States Patent [19]

Seiler et al.

[11] Patent Number: 5,283,106

[45] Date of Patent: Feb. 1, 1994

[54] NONWOVEN MATERIAL OF TWO OR MORE LAYERS, IN PARTICULAR WITH LONG-TERM FILTER PROPERTIES AND MANUFACTURE THEREOF

[75] Inventors: Kurt Seiler, Abtsteinach; Peter Heidel, Bobingen, both of Fed. Rep. of Germany

[73] Assignee: Hoechst Aktiengesellschaft, Fed. Rep. of Germany

[21] Appl. No.: 621,793

[22] Filed: Dec. 4, 1990

[30] Foreign Application Priority Data

Dec. 6, 1989 [DE] Fed. Rep. of Germany ....... 3940264

[51] Int. Cl.$^5$ .............................................. B32B 27/14
[52] U.S. Cl. ..................................... 428/198; 55/524; 55/527; 55/528; 156/148; 156/291; 156/297; 156/308.2; 428/134; 428/136; 428/212; 428/215; 428/219; 428/284; 428/286; 428/296; 428/297; 428/298; 428/300; 428/181
[58] Field of Search ............... 428/134, 136, 218, 284, 428/297, 298, 286, 296, 181, 213, 300, 212, 215, 198, 219; 55/524, 527, 528; 156/148, 291, 297, 308.2

[56] References Cited

U.S. PATENT DOCUMENTS

| | | | |
|---|---|---|---|
| 4,377,615 | 3/1983 | Suzuki et al. | 428/218 |
| 4,761,322 | 8/1988 | Raley | 428/218 |
| 4,765,812 | 8/1988 | Homonoff et al. | 428/283 |
| 4,818,586 | 4/1989 | Smith et al. | 428/218 |
| 5,079,074 | 1/1992 | Steagall et al. | 428/280 |

*Primary Examiner*—James J. Bell
*Attorney, Agent, or Firm*—Connolly & Hutz

[57] ABSTRACT

There is disclosed a multilayered filter material comprising nonwovens made of fibers or filaments of identical or different polymers, said filter material being composed of a depth filter and a fine filter which both have a homogeneous density perpendicular to their surface and have been joined together in such a way that the area covered by the bonding dots does not exceed 75%. The depth filter is from 2 to 20 times thicker than the fine filter, and they have different densities. There is also disclosed a process for manufacturing the filter material.

11 Claims, No Drawings

NONWOVEN MATERIAL OF TWO OR MORE LAYERS, IN PARTICULAR WITH LONG-TERM FILTER PROPERTIES AND MANUFACTURE THEREOF

DESCRIPTION

Nonwoven material of two or more layers, in particular with long-term filter properties, and manufacture thereof The present invention relates to a multilayered f ilter material which has long-term f ilter properties and is formed from a depth filter and a fine filter and to effective and economical processes for manufacturing same.

Multilayered filter materials, specifically for dust collection from gases, are already known in the prior art. For instance, the manufacture of filter hoses, for example, requires textile sheet materials whose mechanical properties ensure a stable shape under a sustained mechanical or pneumatic cleaning stress on the filter hose. For instance, DE-A-1 607 669 describes filter materials comprising wool felts provided with a support grid consisting of a woven or knitted fabric or cross-laid filaments by needling the wool felts to the support grid. Similarly, a web consisting of crimped staple fibers, for example, can be needled to a support material in such a way that a loop pile forms on the web remote side of the support. The manufacture of such filter materials is costly, since it always requires an additional support fabric.

JA-59 080 313 by contrast is directed to a single-layered filter material which, in contradistinction to the present invention, possesses a density gradient. However, the manufacture of filters of such design is difficult and costly, since specific spinning and laying means for web formation are required for achieving a density gradient and the equipment for producing such products is very prone to breakdown.

It is an object of the present invention to provide a filter material of high strength and good dimensional stability, even following prolonged mechanical stress over a sustained period, which can be manufactured in a simple and economical manner, without having to resort to special apparatus.

This object is achieved by the present invention by combining two nonwovens to form a laminate material. The filter according to the present invention comprises a thin nonwoven which in turn is single- or multilayered and which has a high packing density and in this way acts as a fine filter underneath or atop a thicker, less densely packed nonwoven which in turn is single- or multilayered and acts as a depth filter. The fine filter and depth filter nonwovens are preferably single-layered. Multilayered fine filters and depth filters may be advantageous in solving specific filter problems. The filter according to the present invention is very strong and highly pleatable due to the fine filter. The two filter webs have a homogeneous structure, i.e. a uniform fiber density perpendicular to their area. Manufacture of the filter material according to the present invention requires no special apparatus, so that it is simple and economical to manufacture. The nonwovens for the filter material according to the present invention may comprise smooth or crimped fibers, for example staple fibers, or filaments made of polymers, including combinations of different polymers. The fine filter and the depth filter of the filter according to the present invention consist of nonwovens, particularly preferably filament nonwovens. For example, the fine filter sheet material preferably consists of a filament nonwoven which has been consolidated with fibrous or pulverulent thermal or adhesive binders, whereas the depth filter sheet material consists of a feltlike nonwoven or a needled filament nonwoven.

It has now been found, surprisingly, that by combining the two nonwoven layers of different packing densities it is possible to achieve a particularly high filtration rate. The generally accepted definition of the packing density is the ratio of the basis weight to the thickness of a textile sheet material. The two webs are held together mechanically, for example as a result of needling, or as a result of welding or adhering in such a way that the resulting laminate still possesses an adequate air permeability, so that the area covered by the bonding dots should not exceed 75%, preferably 50%. In the f ilter according to the present invention the upper limit of the area occupied by the bonding dots is determined by the still attainable air permeability, while the required low delaminability and high mechanical strength and stiffness dictate the lower limit of the area occupied by bonding dots.

For better removal of fine dust, the fine filter is on the clean air side, so that the gas stream is advantageously passed into the filter according to the invention on the depth filter side, which has a high storage capacity and is intended to retain large dust particles in order thereby to avoid any blinding of the downstream fine filter.

To manufacture the filter according to the present invention, the fine filter and depth filter nonwovens are separately produced and thermally or chemically consolidated in a conventional manner, placed on top of one another in a subsequent step and joined together at their contact surfaces mechanically or by welding or adhering. The two layers are joined together for example by means of a hot-melt adhesive, which may be applied for example in powder or thread form,.by needling or, in a preferred embodiment, by means of specific films of hot-melt adhesives. Further particular embodiments will be described later in this text.

The most important requirement of filter fabrics and bonded fiber webs is a very high air permeability, combined with high dust-retaining power. It has been found that these requirements are best met by f ilter materials in which the depth filter is from 2 to 20, preferably from 3 to 10, times thicker than the fine filter layer, which in general has a thickness between 0.2–0.6 mm. To ensure adequate air permeability and avoid blinding of the filter material on the one hand while maximizing removal of dust from the gas on the other, the packing density of the fine filter should be between 0.10 and 0.20 g/cm$^3$, preferably between 0.12 and 0.16 g/cm$^3$, whereas that of the depth filter should be between 0.08 and 0.15 g/cm$^3$, preferably between 0.10 and 0.13 g/cm$^3$.

In a particular embodiment of the filter according to the present invention, the filaments of the two nonwovens have different linear densities, the linear density of the depth filter being in general between 4 and 20 dtex, preferably between 8 and 12 dtex. The linear densities of the fine filter are preferably smaller, between 1 and 6 dtex, preferably between 2 and 4 dtex. The filter according to the present invention has a longer life compared with customary filter materials. This must be ascribed to the stabilizing effect of the fine filter, which also ensures good pleatability of the laminate, as a result of which the specific filter area per volume can be increased manifold, which in turn ensures longer use times and a higher filtration rate. For this purpose the basis weight of the fine filter should preferably be within the range between 30 and 100 g/m$^2$ and hence below that of the depth filter, which has a basis weight between 150 and 500 g per m$^2$.

The right choice of fiber denier, density of the fiber material and the packing density also makes it possible to adapt the construction of the filter according to the present invention to the specific requirements of the various fields of application.

Webs can in principle consist of fibers, ranging in length from a few millimeters to the length which is normally customary for the spinning of fibers, or of endless filaments. Suitable fibers for the webs are not only jute or animal fibers, for example protein fibers such as wool, but also man-made fibers composed of natural and synthetic polymers. Man-made fibers are preferable to natural fibers, since they are better at meeting the qualitative requirements expected of the materials used. For instance, it is possible to vary the linear densities of synthetic filaments and to optimize their mechanical properties. Similarly, they have a higher thermal and chemical resistance, so that webs produced therefrom are suitable for use as filter materials even at elevated temperatures and for dedusting aggressive gases. For instance, the temperature of a gas which is to be dedusted with wool as the filter material must not be higher than 100° C., while synthetic fibers can be used at above 150° C. polytetrafluoroethylene (Hostaflone ®) even at up to 220° C.

Suitable synthetic polymers for the webs are for example polyolefins, polyacrylonitrile, polyamide and polyester, preference on account of the favorable processing characteristics being given to polyamides and polyesters, in particular to the latter. The preferred polyester is polyethylene terephthalate. The webs can consist of endless or staple fibers; particular preference is given to spunbonded webs from melt-spun synthetic materials, preferably polyester, in particular polyethylene terephthalate.

Web formation can be effected by various conventional techniques, of which mechanical, aerocynamic or hydrodynamic web formation is used for natural and synthetic staple fibers and filaments and electrostatic web formation for very fine denier fibers. Spunbonded webs are preferably formed from melt-spun filaments of thermoplabtics, e.g. polyethylene, polypropylene, polyamide or polyester, preferably polyethylene terephthalate, which are subsequently consolidated by needling, a shrinkage treatment or by the addition of binders. Preference is given to the spunbonded process in which the filament-forming polymers are in one operation melt-spun and cooled in air streams, drawn and then directly laid in web form. Spunbonded nonwovens are particularly preferred for use as basic material for the filter material according to the invention on account of their commercial and qualitative advantages over other nonwovens.

The nonwovens used for manufacturing the filter according to the current invention are preferably used in the consolidated state. The webs can be consolidated in any conventional manner, for example by thermal bonding under pressure, in which the web is subjected to a calendering treatment, or by needling or by thermal bonding using binders, preferably hot-melt adhesives, for example in fiber or powder form, in which case the hot-melt adhesives must have a melting point which is lower than that of the fiber material of the web, or the preconsolidation can be effected using a combination of the abovementioned measures.

The welding or adhering together of the nonwovens of the laminate must be effected in such a way as to produce a total structure which does not tend to delaminate under normal stresses. This thermal or adhesive joining together may be effected at a multiplicity of spaced-apart points, which are either randomly distributed or distributed in the form of a more or less regular repeat in such a way as to produce uniform attachment between the layers. However, the layers can also be joined together via parallel or crossing spaced-apart linear areas. If the join is to be effected by welding, it is advantageous to carry out the welding as described above either at a multiplicity of points or in a multiplicity of linear regions, advantageously by means of an embossing calender. Similarly, an adhesive joining together of the layers may as described above be effected via dots, i.e. via a multiplicity of individual dots, or via a multiplicity of spaced-apart, parallel or crossing linear regions or geometrical figures, in which case the bonding dots may also be imprinted for example by screen printing. The adhesive is introduced between the layers to be joined together in accordance with whether the adhesive joining together is to be effected by dots or via linear regions. Suitable adhesives are for example hot-melt adhesives arranged within the regions in question between the layers in dot form or in linear form as a powder or paste, or else thickened dispersions of various homopolymers or copolymers, which become cured either by evaporation of a solvent or by some other setting process, for example crosslinking, and are capable of effecting a permanent join between the layers.

In joining the two nonwoven webs together it is necessary to choose a process which does not lead to uniform or even complete coverage of the two areas, so that a high air permeability is still ensured after the process.

This process is also referred to as laminating, which in this case however does not imply complete coverage. The particularly preferred way of producing the join between the individual layers is the use of hot-melt adhesives since they work without giving off solvent vapors and do not require the use of aggressive chemicals. Suitable adhesives are all the abovementioned known adhesives applied in a manner adequate to the join to be produced. The use of adhesives is of course only necessary if the layers are to be joined together by adhering; they need not be used if they are to be joined together by welding.

In the process of flame lamination, in which the surfaces of foams of polyesters, polyethers or polyurethanes may be softened by means of a gas flame, the choice of foam density and the intensity of flame application make it possible to control the strength of the adhesive bond.

Instead of applying an adhesive between the layers of filament nonwovens, it is also possible to use a conventional film of hot-melt adhesive whose melting point must be below the melting point of the nonwoven fibers. Such a particularly preferred lamination process is possible for example by means of a slit film, which may be made of various polymers, and makes it possible to produce laminates of defined air permeability. In this lamination process, a slit film is placed on top of one of the two nonwoven webs and irradiated by means of infrared lamps. The slit film opens out and forms a tacky, netlike structure. By bringing together the materials to be bonded to each other and exerting a roll pressure an intimate but air-permeable bond is produced between the two webs. In a similarly particularly preferred lamination process, the joining together of the two sheetlike structures can be effected by introducing between the two filament nonwovens a layer of a binder fiber nonwoven.

Such binder fiber nonwovens generally comprise relatively coarse-denier fibers of polyolefins whose melting point is below that of the filament nonwovens to be joined together, so that the three layers can be joined together by applying an amount of heat which is just sufficient to soften the binder fiber nonwoven but not the surrounding filament nonwovens.

The heat treatment or the combined pressure and heat treatment of the stack for the purpose of effecting a firm connection between the layers must be adapted to the chosen type of bond. If the layers are to be joined together without the aid of an adhesive, then the dotwise or linear bond between the layers is brought about by a combined pressure and heat treatment, preferably in a suitable heated calender, in particular a calender equipped with embossing rolls. This process of hot calendering is preferably used to impress a pattern with a regular repeat into the surface of the laminate, which presumably leads to a combined mechanical entanglement and local superficial welding together of the layer materials. It is found that this makes it possible to produce a very firm bond between the layers of the laminate. In the case of application of an adhesive in one of the abovementioned ways, the layers may also be joined together under a relatively alight pressure, just sufficient for forcing the layers together without forming bubbles or leaving a space in between. The heat treatment must be adapted to the nature of the adhesive; that is, if a hot-melt adhesive is used, the temperature must be above its melting point. To effect the adhesive joining together it is basically possible to use any apparatus which makes it possible to heat the material to the required temperature while at the same time ensuring adequate contact between the surfaces. A particularly suitable apparatus is again a heated calender, specifically a felting calender.

The filter material according to the invention, by virtue of its good long-term filter properties and good pleatability, is particularly highly suitable for use as a folded filter for filter cassettes and for filter cartridges.

EXAMPLE

A spunbonded web plant comprising an extruder, a spinning pack with a spinneret, a pneumatic takeoff element and a conveyor belt was used to produce various polyethylene terephthalate webs.

The basis weight of the webs was 300 g/m² for the depth filter and 80 g/m² for the fine filter, the linear densities being 8 dtex and 3 dtex respectively.

The depth filter, having been mechanically consolidated with the aid of felting needles, is heat-set at temperatures above 180° C. The fine filter, having been preconsolidated by means of an embossing calender, is impregnated with a polymer dispersion, dried and subjected to a condensation reaction.

The two nonwovens are laminated together, for example with a slit film consisting of a modified polyolefin from XIRO AG. This slit film is notable for high adhesive properties. The basis weight of the film was 30 g/m² and it had 66,000 slits per m².

Given that the melting point of the polymer was 90° C., the lamination was carried out at a temperature of 170° C. on average, produced with the aid of infrared lamps.

The following air permeabilities were determined:

|   | | Air permeability |
|---|---|---|
| 1.) | depth filter only TREVIRA spunbonded type 10/300 g/m² | 8000 m³/h/m² |
| 2.) | fine filter only TREVIRA spunbonded V 62/80 g/m² | 4500 m³/h/m² |
| 3.) | Filter material according to the present invention: combination of depth and fine filters | 1000 m³/h/m² |

| Type | T 10/300 | V 62/80 |
|---|---|---|
| Polymer | PES | PES |
| Denier (dtex) | 8 | 3 |
| Basis weight (g/m²) | 300 | 80 |
| Packing density (g/cm³) | 0.111 | 0.145 |
| Layer thickness (mm) | 2.70 | 0.55 |

We claim:

1. A multilayered filter material comprising nonwovens made of polymer fibers or filaments, said filter material including a depth filter for filtering out particles throughout its entire depth and a fine filter for filtering out particles along its surface, both filters having a homogeneous density perpendicular to their surface and being joined together by adhesive or welding in such a way that the area so joined does not exceed 75%, the fine and depth filters each comprising a filament nonwoven with the depth filter having a thickness from 2 to 20 times greater than the fine filter, the depth filter having a basis weight from 150 to 500 g/m² and the fine filter having a basis weight from 30 to 100 g/m², and wherein the fiber denier of the depth filter is between 4 and 20 dtex and the fiber denier of the fine filter is between 1 and 6 dtex whereby the linear densities of the fine filter are smaller than the linear densities of the depth filter.

2. The multilayered filter material as claimed in claim 1, wherein the depth filter is upstream of the fine filter.

3. The multilayered filter material as claimed in claim 1, wherein the individual layers have different packing densities.

4. The multilayered filter material as claimed in claim 1, wherein the individual layers have different fiber deniers.

5. The multilayered filter material as claimed in claim 1, wherein the multilayer filter is held together by means of an adhesive thermoplastic slit film.

6. The multilayered filter material as claimed in claim 1, wherein the filter joined area is less than 50%.

7. The multilayered filter material as claimed in claim 1, wherein the fine filter is from 0.2 to 0.6 mm in thickness.

8. The multilayered filter material as claimed in claim 1, wherein the packing density of the depth filter is from 0.08 to 0.15 g/cm³.

9. The multilayered filter material as claimed in claim 1, wherein the packing density of the fine filter is from 0.10 to 0.20 g/cm³.

10. The multilayered filter material as claimed in claim 1, possessing pleatability.

11. A process for manufacturing a multilayered filter material wherein a nonwoven fine filter for filtering out particles along its surface and a nonwoven depth filter for filtering out particles throughout its entire depth are separately produced and thermally or chemically consolidated, placed on top of one another in a subsequent step and joined together at their contact surface mechanically or by welding or with adhesive.

* * * * *